Figure 1:
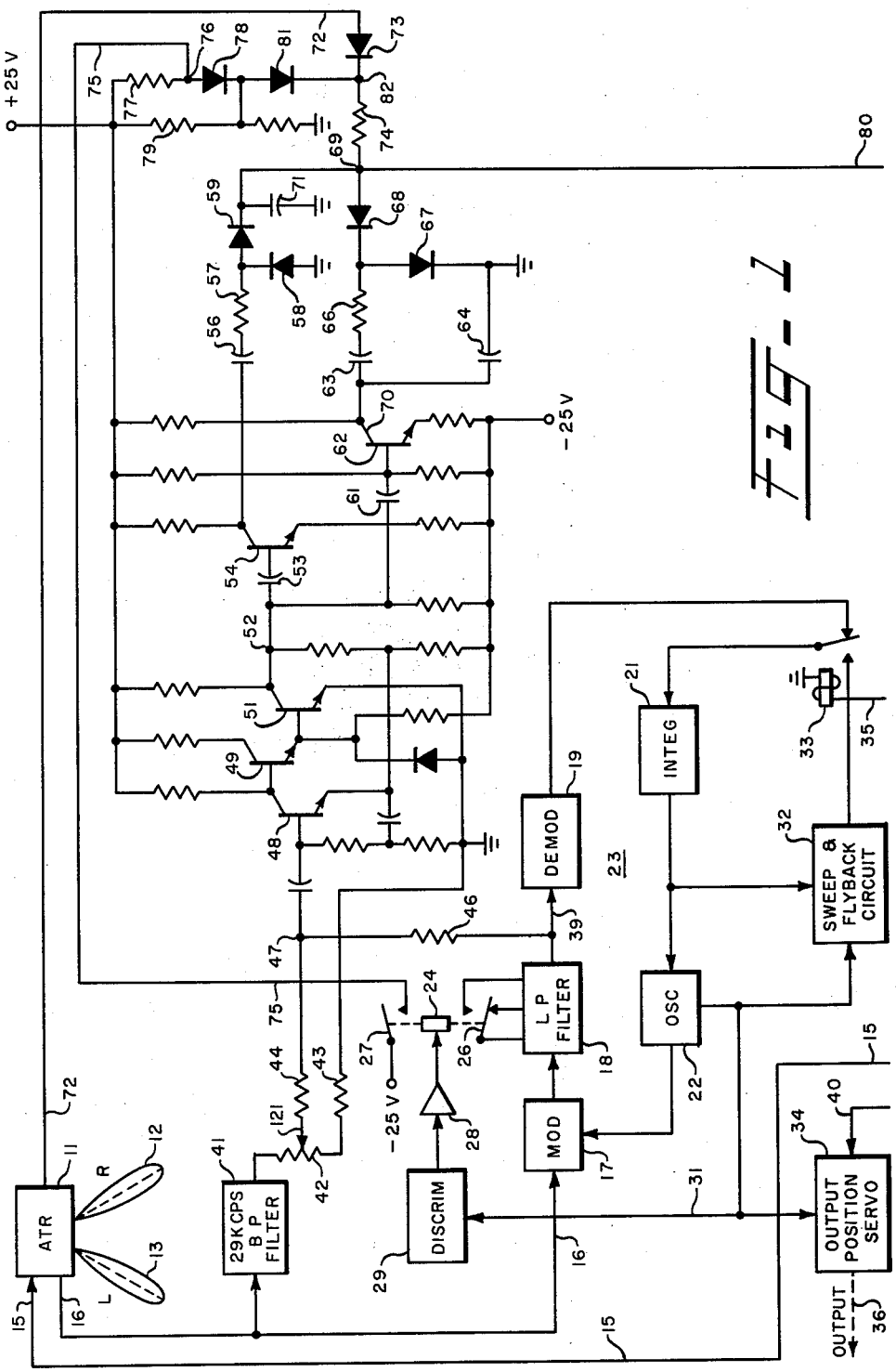

Oct. 30, 1962

J. W. GRAY ETAL 3,061,830

SIGNAL-TO-NOISE DETECTOR

Filed Dec. 23, 1960

2 Sheets-Sheet 2

FIG-2

United States Patent Office 3,061,830
Patented Oct. 30, 1962

3,061,830
SIGNAL-TO-NOISE DETECTOR
John W. Gray, Pleasantville, Stanley King, Larchmont, and Joseph Reed, New Rochelle, N.Y., assignors to General Precision, Inc., a corporation of Delaware
Filed Dec. 23, 1960, Ser. No. 77,917
4 Claims. (Cl. 343—8)

The invention relates to Doppler air navigation systems and particularly to circuits used therein for detecting and measuring the ratio of Doppler signal to noise signal. At a selected threshold level the detector generates a signal for switching the system into or out of operation.

Doppler radar navigation systems for aircraft generally employ a frequency-tracking circuit to which the received Doppler-frequency signal spectrum is applied. This circuit locks to the central frequency of the spectrum and tracks it, remaining locked to it during normal Doppler frequency changes.

Such a tracking circuit is described in U.S. Patent No. 2,915,748 and in an article entitled, The AN/APN-81 Doppler Navigation System, published in Transactions ANE-4, of the Institute of Radio Engineers, December 1957, pp. 202–211.

A typical resonant frequency tracker contains a closed feedback loop which includes a modulator, an oscillator and an integrator. The frequency tracker additionally includes a sweep and flyback circuit for acquiring the Doppler signal, an azimuth servomechanism for adjusting or slewing the antenna in azimuth, and a signal-to-noise detector to measure the ratio of signal to noise ($S/N$) and to control the operation of the sweep and flyback circuit. Such a signal-to-noise detector is the subject of this invention.

In normal operation, after the sweep and flyback circuit has acquired the signal the signal-to-noise detector senses a high ratio of signal to noise and disconnects the sweep and flyback circuit.

If, during normal operation the Doppler signal should fade and the signal-to-noise ratio should drop below a selected threshold value, the signal-to-noise detector emits a command signal causing the sweep and flyback circuit to be reconnected and to start searching for a strong signal. The command signal also locks the system outputs so that they continue to indicate values corresponding to the last received inputs. This is termed the memory mode of operation. When the system is first put into operation it operates in the memory mode.

If one of the two Doppler signals from the right and left microwave beams is lost, the frequency tracker continues to operate on the remaining signal. This is termed half-memory operation. Provision is made to acquire the other signal and to pass to the normal mode of operation.

The object of this invention is to provide, in a Doppler frequency tracker, a signal-to-noise detector to control, through the sweep and flyback circuit, the mode of operation of the frequency tracker in accordance with received signal strength as compared with the receiver noise level.

Another object of this invention is to provide such a signal-to-noise detector having a single wideband amplifier for both signal and noise. This has the advantage of securing a more precise measurement of the signal-to-noise ratio, resulting in the utilization for system control of threshold ratios lower than has been possible in the past.

A further understanding of this invention will be secured from the detailed description and the drawings, in which:

FIGURES 1 and 2 taken together constitute a schematic drawing of an embodiment of the invention.

Referring now to the drawing, a microwave antenna-transmitter-receiver 11 emits at least two microwave beams, 12 and 13, in directions normally straddling the ground track of the aircraft carrying the system and directed ahead of or behind the aircraft. These beams, 12 and 13, are emitted in alternation at a low rate of, for example, 1 c.p.s., controlled from the 1-c.p.s. power terminal 14 through conductor 15. The receiver of antenna-transmitter-receiver 11 demodulates the microwave signal and delivers the demodulated signal, including the Doppler frequency spectrum and noise, on conductor 16 to the frequency tracker and other associated equipment. The circuits of these components are shown in the remainder of the drawing.

Conductor 16 conveys the receiver signals including demodulated Doppler spectra to a modulator 17 which, together with low-pass filter 18, demodulator 19, integrator 21 and oscillator 22 constitute the principal components of the main frequency tracker loop 23.

The low-pass filter 18 is adjustable by the contacts 26 of a relay 24 to a bandwidth of either 2–75 c.p.s. or 2–350 c.p.s. This is necessary because the width of a Doppler spectrum is directly proportional to its center frequency. In this case, in which the system is employed to measure aircraft speeds up to 600 knots, the relay 24 is operated when the Doppler frequency is increased to represent air craft speeds of over 300 knots. Relay 24 also contains bias-control contacts 27, the use of which will be explained later. The relay 24 is operated through an amplifier 28 and discriminator 29 from changes of frequency in the output conductor 31 of oscillator 22.

A sweep and flyback circuit 32 controls, through integrator 21, the operation of oscillator 22. The sweep and flyback circuit is connected to or removed from the circuit by means of a control relay 33. A relay in a position servomechanism 34 opens the frequency tracker output during memory and half-memory operation by locking the servomotor, permitting the output shaft 36 to retain its latest angular position. Relay 33 is operated through conductor 35 from a memory mode relay 38 and servo 34 is operated through conductor 40 from a normal mode relay 37. These relays 37 and 38 constitute the output components of the signal-to-noise detector.

The inputs to the signal-to-noise detector are taken from conductor 16 and from the output conductor 39 of low-pass filter 18. Conductor 16 is connected to a bandpass filter 41 having a transmission band outside of the Doppler signal frequency range. For example, if the Doppler frequency range is 1.3 to 27 kc. p.s., the filter transmission extends over a 1 kc. p.s. band centered at 29 kc. p.s. The filter output is applied to a mixing circuit consisting of a potentiometer 42 and resistors 43, 44 and 46, to which the signal-plus-noise input from conductor 39 is also connected. Here the signals are merely added or mixed together without intermodulation. The composite signal at the junction 47 thus consists of noise alone obtained from the filter 41 and both noise within the bandwidth and Doppler signal obtained from the filter 18.

The composite signal is amplified in a wideband amplifier comprising three transistors 48, 49 and 51. This amplifier has a gain of about 100 and has both direct-current and alternating-current feedback. It has high input impedance and a bandwidth between 3 db points of 5 cycles to 80 kilocycles and may conveniently be of the type described in U.S. patent application Serial Number 69,206 filed November 14, 1960.

The amplified composite signal at junction 52 is separated into signal and noise components by filters and amplifiers followed by detectors. The high-frequency path for the noise signal includes series capacitor 53, transistor 54, series capacitor 56, resistor 57 and rectifying diodes 58 and 59. The low-frequency path for the Doppler signal and associated noise within the signal bandwidth includes large series capacitor 61, transistor 62, large series capacitor 63, shunt capacitor 64, resistor 66, and rectifying diodes 67 and 68. The four rectifying diode outputs are connected together at junction 69. The junction 69 thus represents an algebraic addition circuit where the input signals are mixed without intermodulation. The polarities of diodes 58 and 59 are such as to apply to junction 69 a positive direct current proportional to the 29 kc. p.s. noise band signal and the polarities of diodes 67 and 68 produce a negative current at the same junction proportional to the Doppler signal amplitude. The connection at junction 69 between the two pairs of rectifying diodes therefore tends to take a potential depending on the difference of the two applied currents and the source impedances. Much of the noise associated with the Doppler signal is removed at the collector 70 of transistor 62 by the grounded 1-mfd. capacitor 64, which attenuates all frequencies above 30 c.p.s.

A capacitor 71 is connected between the junction 69 and ground. This capacitance is of such size as to smooth the potential at junction 69 while not removing any 1-c.p.s. component which may be present. As an example of an appropriate capacitance, in one case these requirements were satisfied by a 4-mfd. capacitor.

Provision is made for controlling the threshold value of potential at junction 69 over about a 10 db range in proportion to the intensity of the Doppler signal. The purpose of this control is, on strong Doppler signals, to reduce the likelihood of operation on side lobes of the antenna radiation and on the second harmonic of the Doppler spectrum while not impairing the sensitivity of the signal-to-noise detector in detecting the fundamental frequency of weak Doppler signals. A connection 72 is taken from the automatic gain control bus in the Doppler audio amplifier in the antenna-receiver-transmitter 11. This bus potential ranges between +1 and +3 volts and is proportional to the strength of Doppler signal. This potential is applied from conductor 72 through a diode 73 and resistor 74 to the junction 69.

Provision is also made for increasing the sensitivity by lowering the threshold value when speeds greater than 300 knots are being measured. This is necessary because the Doppler signal amplitude is an inverse function of the aircraft speed. Sensitivity is increased at high speeds by connecting the contacts 27 of relay 24 to a −25-volt source and through conductor 75 to the junction 76 between resistor 77 and diode 78. When contacts 27 are open, positive current flows through resistors 79 and 77 in parallel, through diode 81 to junction 82, then through resistor 74 to junction 69, increasing its positive potential and raising the threshold potential due to both noise and bias. However, when contacts 27 are closed, negative potential is applied to junction 76, causing diode 78 to become nonconductive, so that current flows only through resistor 79. The increased potential drop causes a lower positive potential to be applied to junction 69, thus reducing its threshold value and making the signal-to-noise detector more sensitive.

The potential at junction 69 is thus negative for strong Doppler signals and positive in the absence of any Doppler signal. The threshold value may be close to zero volts and is manually set, in addition to the described automatic controls, in a manner which will be explained later.

The potential of junction 69 is applied through conductor 80 to a modulator 83, where it is modulated by 400 c.p.s. signal input obtained from source terminal 84 to form an alternating potential proportional to the direct-current signal potential. The alternating signal is amplified in amplifier 86 and demodulated in demodulator 87. This demodulator also inverts the signal so that its direct-current output in conductor 88 has a polarity opposite to that in junction 69.

Conductor 88 is connected through a resistor 89 shunted by a diode 90 to the contact arm 91 of a relay 92. This relay is connected for operation from the 1 c.p.s. source terminal 14. The two fixed relay contacts 93 and 94 are connected to the inputs of two amplifiers 96 and 97. Amplifier 96 comprises NPN transistors 98 and 99 and amplifier 97 comprises NPN transistors 101 and 102. These amplifiers are shunted by capacitors 103 and 104, respectively, which produce integration, causing the amplified output currents to continue flowing for at least a half second after the input signals have been cut off. The collector 106 of transistor 99 is connected through the coil of a relay 107 to a positive potential terminal, and the collector 108 of transistor 102 is connected through the coil of a relay 109 to the same positive potential terminal. The contact arm 111 of relay 107 is connected to a negative potential terminal, and contact arm 112 of relay 109 is connected to ground. The normally closed contacts 113 and 114 of relays 107 to 109 are connected to the coil of the memory mode relay 38. The normally open contacts 116 and 117 of relays 107 and 109 are connected to the coil of the normal mode relay 37. The normally-closed contacts 118 of normal mode relay 37 close a circuit from the positive potential terminal to lock the servomechanism 34. The front contacts 119 of the memory mode relay 38 close a circuit from the positive potential terminal to operate the relay 33.

In the operation of the signal-to-noise detector circuit, the antenna lobes 12 and 13 are beamed alternately at the 1 c.p.s. rate and in synchronism with operation of the relay 92 so that when the right lobe 12 is beamed the relay arm 91 rests on contact 93 and during beaming of left lobe 13 the arm 91 rests on contact 94. Thus echo signals of sufficient strength from the right lobe 12 operate relay 107. Similarly, echo signals of sufficient strength from the left lobe 13 operate relay 109.

In order to adjust the operating points of relays 107 and 109, a signal of a minimum and known amplitude is supplied to the system. The slider 121 of potentiometer 42 is then adjusted until the relays 107 and 109 just operate. Reasonable threshold values of the signal-to-noise ratio, for use on weak signal input and with relay contacts 27 open, lie between 0 and +3 db. Operation of the AGC bias control and closure of contacts 27 will increase the threshold operating point to a value of $S/N$ of about +12 db.

The 29 kc. p.s. noise signal from filter 41 is mixed with the Doppler-derived signal and associated noise at junction 47, and the composite signal is amplified in the amplifier comprising transistors 48, 49 and 51, as before stated. Since both noise and signal are equally amplified, at all amplitude levels and at all signal frequencies, the proportion of signal to noise set by the potentiometer 42 is also the same proportion found at the amplifier output. As compared with the use of separate, inexpensive amplifiers, not identical in characteristics, for noise and signal, this permits an increased accuracy of setting of the potentiometer 42 which in turn permits a threshold setting about 2 db lower when the single amplifier is used for both signal and noise. This in turn permits a reduction of transmitter power, or a reduction of antenna gain and weight, or an increase of range.

The composite signal is again separated into its signal and noise components in the filters including transistors 54 and 62 and the detectors including diodes 58, 59 and 67, 68. The noise signal is applied to junction 69 as a positive direct current having an amplitude representing noise signal magnitude and the Doppler signal is applied to the same point as a negative direct current having amplitude representing Doppler signal magnitude. The junction 69 serves as a very simple subtracting device so that the difference, D, of signal and noise, or D=S—N, is applied to the modulator 33. The signal-to-noise detector thus does not derive the quotient S/N, but the difference S—N (or N—S). However, since the signal is gain controlled in the receiver 11, at the threshold the values of the two expressions are equal and at other values the difference is qualitatively representive of the quotient. This is all that is necessary for the proper relay operation by the signal-to-noise detector.

When a positive signal is applied to the modulator 83, representing a value of S/N below threshold, the signal at conductor 88 is negative. This is applied through resistor 89 and switch arm 91 to the two amplifiers 96 and 97 in turn, causing the bases 122 and 123 to become negative and making the amplifiers nonconductive. The relays 107 and 109 thus remain unoperated as drawn and operate the memory relay 38. This operates relay 33, causing the sweep and flyback circuit to go into operation. Since relay 37 is unoperated, the output servo 34 is locked, isolating the output shaft 36 and causing the system output meters, not shown, to retain the indications which they have previously attained.

When a negative signal is applied to the modulator 83, representing a value of S/N above threshold, the signal at conductor 88 is positive. This is applied partly through resistor 89 but principally through diode 90 shunting it, and through switch arm 91 to the amplifiers 96 and 97 in turn. They amplify the signal and apply it in turn to the relays 107 and 109. Relay 107 is energized in synchronism with the beaming of antenna lobe 12 and relay 109 is energized in synchronism with the beaming of antenna lobe 13. However, the integrating actions of capacitors 103 and 104 cause the amplifier output currents to keep flowing during the one-half second that each is not energized. This "slow-release" effect is enhanced by diode 90, which forces discharge of the capacitors to pass through the high-resistance resistor 89, increasing the discharge time constants, while not materially impeding the flow of positive current from conductor 88 into the capacitors during their energization. Thus, when strong and equal signal-to-noise ratio signals are applied alternately to the amplifiers 96 and 97, the relays 107 and 109 both remain continuously operated.

When relays 107 and 109 are both operated they hold the normal-mode relay 37 in its operated position and allow the memory-mode relay 38 to remain unoperated. Release of the memory relay releases relay 33, removing the sweep and flyback circuit from operation and closing the feedback path of the frequency tracker 23, causing it to lock to and track the Doppler signal applied to its modulator 17. Operation of the normal-mode relay 37 releases the servo 34, closing the output path from oscillator 22 to the output shaft 36.

Signals may be received from one of the antenna beams but not from the other. This may occur if the aircraft attitude raises one beam off the earth, or in initial operation, when the beams are not equally astride the ground track and return Doppler signals of different frequency, under which condition the sweep circuit causes lock-on to the first one of the two signals encountered.

In either case what is termed half-memory mode of operation results. In this mode one of the relays, 107 or 109, is operated while the other remains normal. This results in both relays, 37 and 38, remaining unoperated. This locks the output shaft 36 and the indicators "remember" the last data given them, while the frequency tracker remains locked to the given signal and tracks it. Operation of the azimuth servomechanism, not shown, then either servos the antenna in the right direction or in the wrong direction. In the first case both beam signals are acquired and operation changes to the normal mode. In the second case the azimuth servomechanism is driven to a stop and contacts at the stop convert the system to the memory mode of operation, from which the system is transferred to the normal mode of operation as described.

What is claimed is:

1. A signal-to-noise detector adapted to be used in a Doppler air navigation system capable of operating in at least a memory mode and a normal mode and containing lobing means for alternately emitting two beams of radiation comprising, a frequency tracker contained in said system, a mixer, means applying to said mixer a noise signal representing the amplitude of total noise in the received signal of said system, means deriving an intelligence signal representing the amplitude of Doppler signal plus bandwidth noise from said frequency tracker and applying said intelligence signal to said mixer, a single-channel amplifier amplifying the mixed output signal of said mixer, means separating the output signal of said single-channel amplifier into two signals representing said intelligence and noise signals, means subtracting said two signals to form a difference signal, means separating said difference signal into first and second signals representing echo receptions of said two beams of radiation respectively, and means operated by said first and second signals converting said Doppler air navigation system from one to another of its modes of operation.

2. A signal-to-noise detector for use with a frequency tracker incorporated in a Doppler air navigation system selectively operable in a memory mode and a normal mode comprising, means connected to the input of said frequency tracker for securing a noise signal, means connected to said frequency tracker for securing an intelligence signal representing Doppler signal amplitude, single-channel amplifier means amplifying both said intelligence signal and said noise signal simultaneously to form a single composite amplified signal, frequency separation means separating said single composite amplified signal into an amplified noise signal and an amplified intelligence signal, rectifier means having said amplified noise and intelligence signals impressed thereon and producing therefrom two direct-current signals of opposite polarities respectively representing said amplified noise signal and said amplified signal, means subtracting said two direct-current signals to form a single direct-current signal representing the difference thereof, lobing means incorporated in said Doppler air navigation system alternately beaming two radiation lobes, amplifier means having two channels, switch means controlled by said lobing means directing said single direct-current signal into said two channels in alternation, and means operated by the output signals of said two channels for controlling the mode of operation of said Doppler air navigation system.

3. A signal-to-noise detector comprising, a Doppler air navigation system selectively operable in a memory mode and a normal mode, said navigation system containing lobing means alternately beaming two radiation lobes, a frequency tracker incorporated in said navigation system, said frequency tracker including a filter, means connected to the input of said frequency tracker for deriving a noise signal therefrom having an amplitude representing noise amplitude, means connected to the output of said filter for securing an intelligence signal having amplitude representing Doppler signal amplitude, said intelligence and noise signals being of different frequencies, mixing means mixing said noise signal and said intelligence signal without intermodulation to form a composite signal, single-channel amplifier means amplifying said composite signal, frequency separation means separating the amplified composite signal into amplified noise and intelligence signal components, detector means producing two direct-current signals of opposite polarities from said amplified noise and intelligence signal components, mixing means subtracting said two direct-current signals without intermodulation to secure a single direct-current signal representing the difference thereof, means amplifying said single direct-current signal, a two-channel amplifier containing integrating feedback paths, switch means synchronously operated by said lobing means to direct said amplified single direct-current signal in alternation into the two channels of said two-channel amplifier, and means operated by the outputs of said two channels in accordance with the presence or absence of signals therein for determining the mode of operation of said navigation system.

4. A signal-to-noise detector comprising, a Doppler air navigation system selectively operable in a memory mode, half-memory mode and a normal mode and containing lobing means for alternately emitting two beams of radiation, a frequency tracker in said system and containing a filter, a mixer, means applying to said mixer a noise signal having amplitude representing total noise amplitude, means applying to said mixer from the output of said filter an intelligence signal including bandwidth noise, said intelligence and noise signals having different frequency spectra, a single-channel amplifier amplifying a mixed signal derived from said mixer, frequency differentiating means separating the single output of said single-channel amplifier into amplified noise and intelligence signal components, rectifier means producing two direct-current signals of opposite polarities from said amplified noise and intelligence signal components, mixer means subtracting said two direct-current signals without intermodulation to secure a single direct-current signal representing the difference thereof, first bias means operated by the magnitude of the signal applied to said Doppler air navigation system for adding a direct-current bias to said mixer means, second bias means operated by a switch at a selected ground speed of said system to apply a bias step to said mixer means, a two-channel amplifier containing integrating feedback paths, switch means synchronously operated by said lobing means to direct said single direct-current signal in alternation into the two channels of said two-channel amplifier, and means operated by the outputs of said two channels in accordance with the presence or absence of signals therein for selecting one or the other of the three modes of operation of said Doppler air navigation system.

No references cited.